United States Patent [19]
Driscoll et al.

[11] 4,082,446
[45] Apr. 4, 1978

[54] SLIDE VIEWER AND PHOTOGRAPHIC COPIER

[75] Inventors: John J. Driscoll, Andover; Thomas A. Svatek, Carlisle; Richard R. Wareham, Marblehead, all of Mass.

[73] Assignee: Polaroid Corporation, Cambridge, Mass.

[21] Appl. No.: 764,719

[22] Filed: Feb. 2, 1977

[51] Int. Cl.² .................. G03B 27/32; G03B 27/52
[52] U.S. Cl. .................................. 355/27; 354/78; 355/45; 355/65
[58] Field of Search .............. 355/18, 27, 28, 40, 355/43, 44, 45, 50, 51, 60, 64, 65; 354/78, 83; 353/109

[56] References Cited

U.S. PATENT DOCUMENTS

| | | | |
|---|---|---|---|
| 3,065,667 | 11/1962 | Edgerton | 355/64 X |
| 3,094,036 | 6/1963 | Benson | 355/45 X |
| 3,354,779 | 11/1967 | Brown | 355/27 X |
| 3,354,804 | 11/1967 | Jones | 355/27 X |
| 3,409,360 | 11/1968 | Nerge | 355/64 X |
| 3,547,534 | 12/1970 | Akiyama et al. | 355/45 X |
| 3,819,264 | 6/1974 | Voorhees | 355/43 |
| 3,911,450 | 10/1975 | Schwartz | 355/43 X |

Primary Examiner—Richard A. Wintercorn
Attorney, Agent, or Firm—John S. Vale

[57] ABSTRACT

A slide viewer/copier operable in a viewing mode for projecting an image of a slide transparency film unit onto a viewing screen for viewing and a copy mode for projecting an image of the slide onto self-developing film unit for exposure and for processing the film unit to produce a photographic copy of the slide.

4 Claims, 11 Drawing Figures

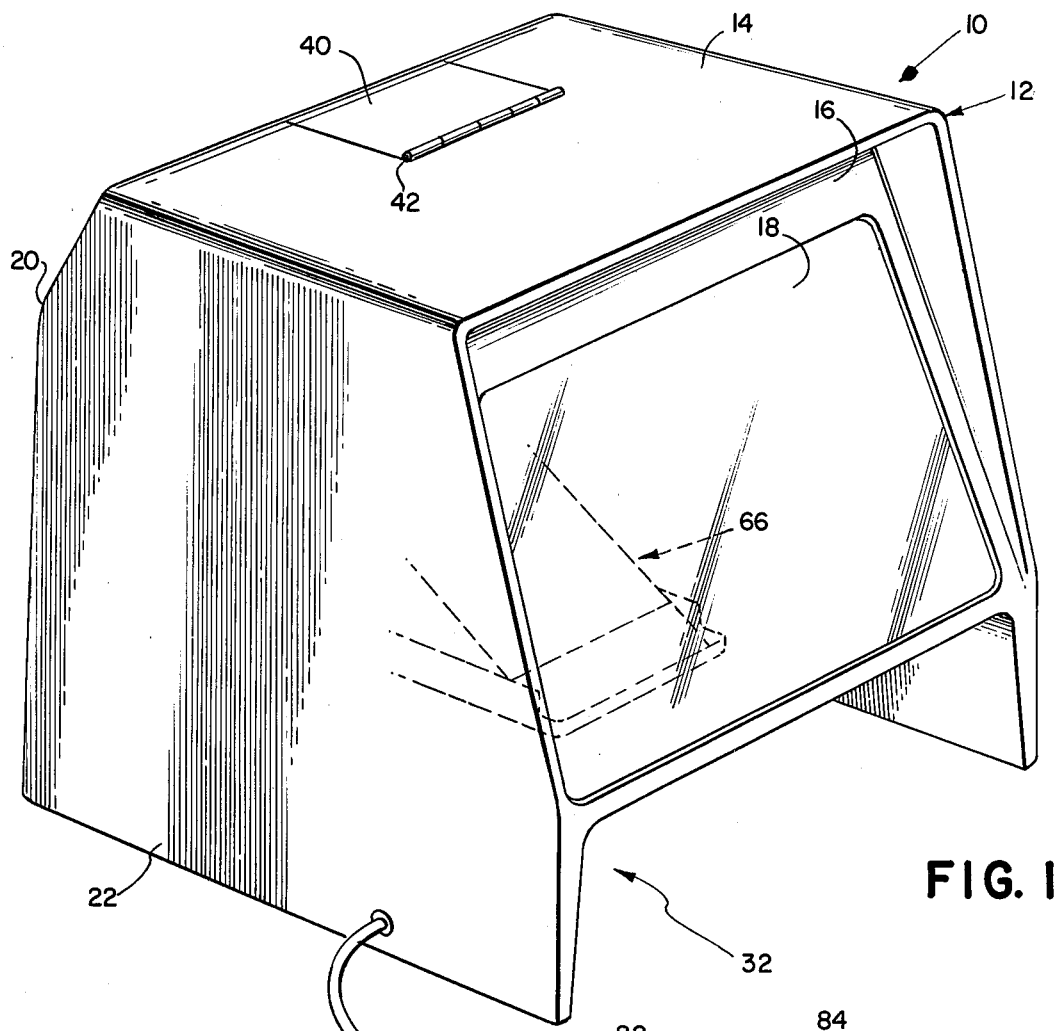
FIG. 1
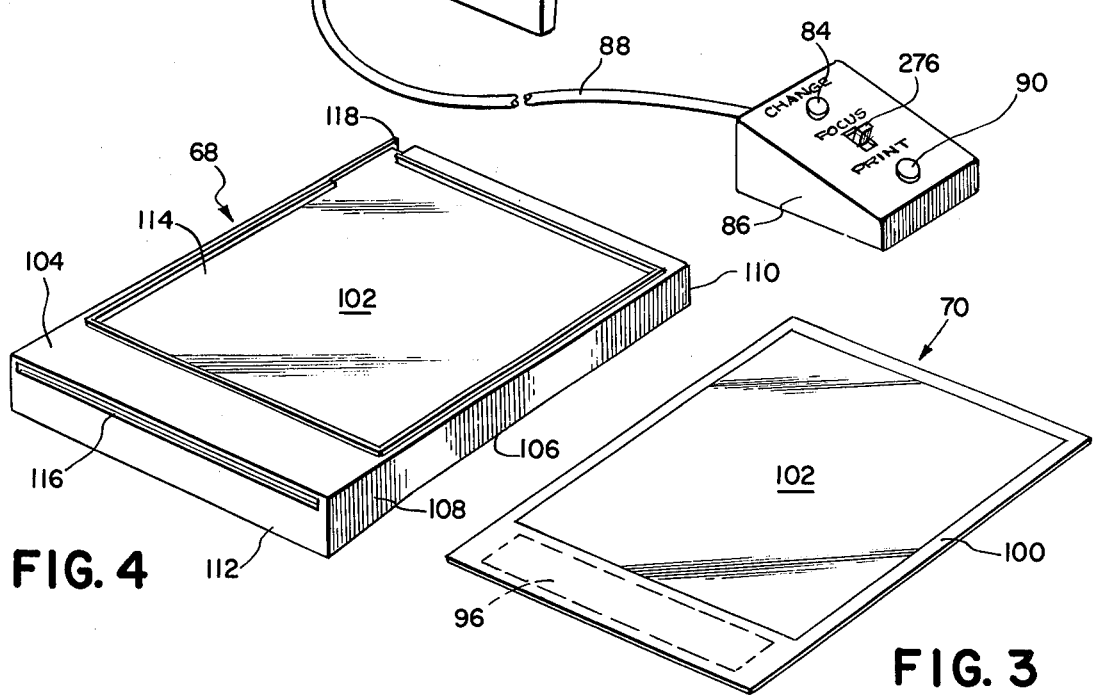
FIG. 4
FIG. 3

SLIDE VIEWER AND PHOTOGRAPHIC COPIER

BACKGROUND OF THE INVENTION

1. Field of the Invention

The present invention relates to the field of photography and, more particularly, to a combination slide viewer and photographic copier.

2. Description of the Prior Art

A large number of amateur photographers use transparency type film or "slides" as the primary image recording medium for their photographic collection. While slides offer the advantage of compact storage and the convenience of group viewing when projected onto a viewing surface, there are disadvantages to this system.

Viewing of the slides is restricted to locations where a projector or other type of slide viewer is available. Generally such equipment is not permanently set up in the home and there is considerable preparation involved before one is ready to show the slides. Also, the slide format is not suitable for display on a wall or desk and copies of the "photograph" cannot be given to relatives and friends who do not have appropriate slide viewing equipment.

There are, therefore, many occasions when the photographer will want to have enlarged reflection print copies of the slides. In most instances, he will not have the necessary equipment or expertise to make such copies himself and the slide will have to be sent off to a commercial photofinisher. This is basically an inconvenient procedure because of the delay involved and it also carries the inherent risk that the slide may be lost or damaged.

There are disclosures in the prior art of apparatus intended for amateur use for making a reflection print copy of a slide utilizing a self-developing film unit. For representative examples of such apparatus see U.S. Pat. Nos. 2,866,380; 3,065,667; 3,653,760; 3,697,175; and 3,754,825. In general, these apparatus includes specially configured self-developing cameras or slide copier accessories that are adapted to be attached to standard self-developing cameras.

While the above apparatus allow the amateur photographer to make reflection print copies of his slides at home, the procedure is not as convenient as it could be. The slide to be copied must be: identified; removed from the projector storage cassette; transferred to the copy camera for copying and then returned to the storage cassette. If the slide is identified during the course of a slide showing, either the showing must be interrupted for a considerable time for the copying procedure or the slide must be set aside for copying later.

Preferably, one would like to identify a slide on screen and have the ability to make one or more enlarged reflection print copies right on the spot in a very short time period without having to use separate copying equipment, and then be able to continue on with the balance of the slide showing. As will be described in detail later, the present invention provides an apparatus in the form of a combination slide viewer and photographic copier which is capable of operating in this preferable manner.

There are photographic apparatus known in the prior art which are able to perform the functions of projecting an image of a transparency onto a viewing screen and making a photographic copy of the transparency, namely, the microfilm or microfiche reader-printers. For representative examples of such apparatus see U.S. Pat. Nos. 2,769,369; 3,240,115; 3,697,176; 3,713,737; 3,722,999; 3,765,759; 3,877,805; and 3,898,004.

These reader-printers however are quite large and mechanically complex machines which are inherently very expensive and are not suitable, nor are they intended, for the amateur photographic market. Also, in general, the reader-printers use special electrostatic or thermal copying paper which is not suitable for making quality color copies of color transparency slides.

SUMMARY OF THE INVENTION

The present invention provides a compact, economical, and relatively simply constructed automatic slide viewer/photographic copier which is selectively operable in a viewing mode for projecting an image of a slide transparency onto a viewing screen and a copying mode wherein an image of the slide is projected onto a self-developing film unit for exposure and the film unit is thereafter automatically processed by advancing it between a pair of processing rollers to produce a reflection print copy of the slide.

In a preferred embodiment the reflection prints are made on an integral type of self-developing film unit such as the SX-70 type manufactured by Polaroid Corporation and the viewer/copier is configured to receive a commercially available pack or cassette of such film units such that the film does not have to be specially packaged for use in the viewer/copier.

The viewer/copier preferably includes a compact box-like housing which is formed in part by a rear projection viewing screen. In preparation for operation, the viewer/copier is loaded with a stack of slides and a container or cassette of self-developing film units is placed in a film processing unit.

In the viewing mode, the viewer/copier operates such the same as a conventional slide projector and has the ability to project images of the slides, sequentially, on the rear projection screen. When the user identifies a slide which he would like to copy, he simply actuates a button which converts the apparatus to its copying mode. The image of the slide is projected onto the forwardmost film unit in the cassette for exposure. After the proper exposure interval, the film unit is automatically advanced through a pair of pressure applying rollers on the film processing unit and out through a film exit slot in the base of the housing where it may fully develop outside of the housing. The viewer/copier automatically converts back to viewing made at the end of the copy cycle. At this point the operator may continue the slide showing or make additional copies of the slide. The conversion from the viewing mode to the copy mode (including exposure and processing) and then back to the viewing mode can be done in a matter of seconds so that there is minimal interruption of the slide showing. Thus, without resorting to the use of separate copying equipment the user may conveniently view his slides and very quickly and efficiently make enlarged reflection print copies of those he chooses.

In a preferred embodiment of the invention, the film processor is a simply constructed unit that includes: a chamber or frame for receiving and supporting a cassette holding a stack of integral self-developing film units therein to locate the forwardmost film unit in the stack in position for exposure; a pair of pressure applying rollers for advancing the film relative thereto while applying a compressive pressure to the film unit to distribute a fluid processing composition therein; and film advance means for advancing the exposed film unit from exposition to a position in engagement with the pressure applying rollers. The film advance means and rollers are preferably motor driven.

The viewer/copier includes: a projection station or position where a slide is located for projection, a slide illumination system; a slide changer for sequentially moving the slides into and out of the projection station; and a projection or optical system for projecting an image of the slide located at the projection station onto the viewing screen when operated in the viewing mode or onto the film unit at the exposure position when operated in the copy mode.

In the illustrated embodiment, the optical system includes a projection lens and a movably mounted mirror. In the viewing mode, the mirror is located in a first position in optical alignment with the projection lens for reflecting image bearing light emanating therefrom onto the rear projection screen. At this time, the mirror is also located in covering or light blocking relation to the film unit at the exposure position so as to shield the film unit from the image bearing light from the lens and from ambient illumination which may be transmitted into the housing through the viewing screen. When the viewer/copier is converted from the viewing mode to the copy mode, the mirror is moved or pivoted from the first position to a second position where it is out of optical alignment with the projection lens and uncovers the film unit for exposure. In the second or copy position, the mirror is still utilized to light shield the film unit from the ambient light passing through the viewing screen but does not serve in an imaging capacity for exposure. Following the exposure, the mirror is moved back to the first position to convert the viewer/copier back to the viewing mode... Means are also provided for adjusting or refocusing the optical system to compensate for the differences in the magnification factor of the viewing and exposure image size.

Therefore, it is an object of the invention to provide a compact, low cost and simply constructed automatic slide viewer/copier for viewing slide transparency film units and for selectively making full color enlarged photographic reflection print copies of such slide transparencies utilizing self-developing film units.

It is another object of the invention to provide a photographic apparatus which is selectively operable for projecting an image of an object onto a viewing surface for viewing and for making a photographic copy of the object utilizing a self-developing film unit and including means for locating the object in position for image projection, means for illuminating the object, means for locating a self-developing film unit in position for exposure, pressure applying means for processing the exposed film unit, and an optical system operable in a viewing mode from projecting an image of the object on a viewing surface and a copy or exposure mode for projecting an image of the object onto the self-developing film unit located at the exposure position.

It is another object to provide such a photographic apparatus wherein the optical system includes a projection lens and a mirror mounted for movement between a first position wherein the mirror is in optical alignment with the lens and reflects image bearing light therefrom onto the viewing surface and at the same time is in blocking relation to the film unit at the exposure position for shielding the film unit from image bearing and ambient light and a second position wherein the mirror is out of optical alignment with the lens and unblocks the film unit for exposure to the image bearing light from the lens while at the same time it light shields the film unit from ambient illumination.

It is yet another object of the invention wherein the photographic apparatus is a compact automatic slider viewer/photographic copier including a housing having a rear projection viewing screen mounted thereon and the movable mirror light shields the film unit at exposure position from ambient illumination transmitted into the housing through the viewing screen.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of a slide viewer/photographic copier showing a portion of a self-developing film unit processor therein in phantom lines;

FIG. 3 is a perspective view of a self-developing film unit suitable for use in the viewer/copier;

FIG. 4 is a perspective view of a film container, holding a stack of the film units of FIG. 3, that is suitable for use with the viewer/copier embodying the present invention;

DESCRIPTION OF THE PREFERRED EMBODIMENT

Figure 2:
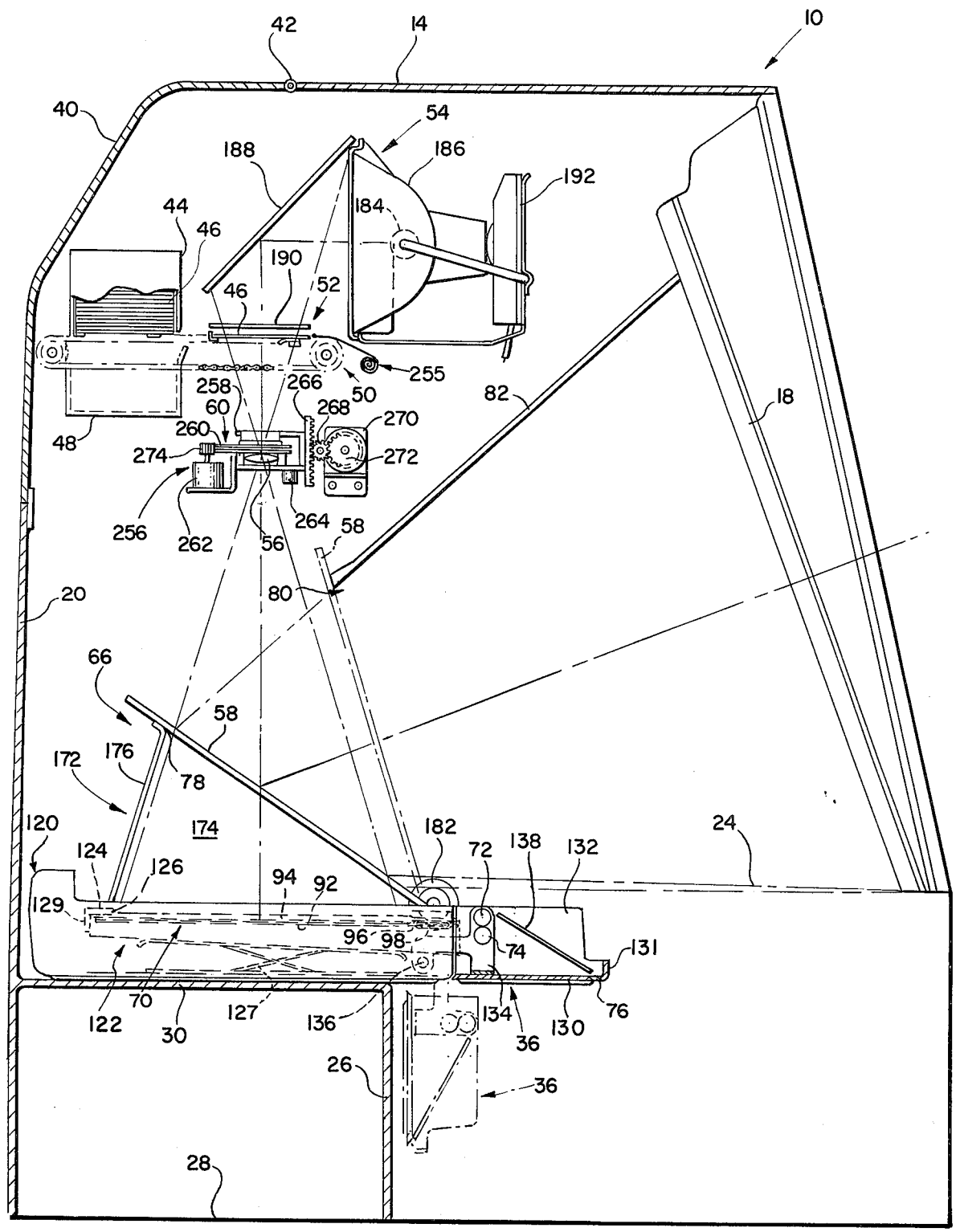
FIG. 2 is a side elevation view, partly in section, of the viewer/copier of FIG. 1 showing certain of its components therein in diagrammatic form.

FIG. 1 of the drawings shows a perspective view of a photographic apparatus in the form of a combination slide viewer/copier 10 embodying the present invention. As will be described in detail hereinafter, viewer/copier 10 is selectively operable for viewing transparency slide film units and for making enlarged photographic reflection print copies of such slides on self-developing film units.

Viewer/copier 10 includes a generally box like housing 12 defined by a top wall 14, a forward wall 16 mounting a rear projection screen 18 thereon, a rear wall 20, a pair of lateral side walls 22, a first or forward horizontal bottom wall section 24 under screen 18 and extending laterally between the interior surfaces of side walls 22 (see FIG. 2) as extending rearwardly part way back towards rear wall 20, a vertical wall section 26 extending laterally between walls 22 and downwardly to the bottom of housing 12 and a second horizontal bottom wall section 28 at the bottom of housing 12 extending rearwardly from the bottom of wall 26 to rear wall 20. Positioned over wall section 28 is a horizontal interior wall section 30 extending between wall 22 and walls 26 and 20.

The forward lower positions of side walls 22, wall section 24, and wall section 26 cooperate to define a generally parallelpiped shaped cavity 32 at the lower forward end of housing 12 into which extends a pivotally mounted pressure roller, film deflecting and film exit slot assembly 36 which forms part of a later to be described unit for processing a self-developing film unit. Assembly 36 pivots between a generally horizontal, operative, closed position shown in solid lines in FIG. 2 and a generally vertical, open, inoperative position (shown in dotted lines) for loading a cassette holding a stack of self-developing film units into the processor unit.

Access to the interior of housing 12 for loading and unloading slide transparencies is provided by an access door 40 which is pivotally connected to top wall 14 at pin 42 for movement between a closed position shown in FIGS. 1 and 2 wherein door 40 blocks an access opening that extends rearwardly along top wall 14 from pin 42 and then part way down housing rear wall 20 and an open position.

The housing 12 may be formed of sheet metal, molded plastic or any other suitable material. The rear projection screen 18 may be formed of any suitable translucent material but preferably is a lenticular type of screen assembly such as described in U.S. Pat. No. 3,848,980 issued on Nov. 19, 1974 to W. T. Plummer and assigned to the same assignee as the present invention.

Located within housing 12 is supply cassette or magazine 44 for holding a stack of transparency slides 46 in preparation for projection; a storage cassette 48 for holding the slides 46 after projection; and a slide changer mechanism 50 for moving a slide 46 from cassette 44 to a projection position or station 52 and then into cassette 48; an illumination system 54 for illuminating a slide 46 at position 52; an optical or projection system including a projection lens 56 and a movably mounted mirror 58; a shutter 60 intermediate lens 56 and projection station 52; and a self-developing film unit processor assembly 66.

The processor assembly 66 is adapted to be loaded with a cassette 68 holding a stack of integral type self-developing film units 70 therein such that the forwardmost film unit 70 in the stack is in position for exposure. After exposure the film unit 70 is advanced between a pair of rollers 72 and 74 on assembly 36 and out through a film exit slot 76 therein.

In the viewing mode of operation, mirror 58 is in its viewing position shown in solid lines in FIG. 2 wherein it is in optical alignment with lens 56 and in covering relation to an exposure aperture 78 in processor unit 66. In this position, mirror 58 reflects image bearing light from lens 56 onto screen 18 and light shields the underlying photosensitive film unit 70 at the exposure position from the image bearing light from lens 56 and any ambient illumination that may be transmitted into housing 12 through screen 18.

In the exposure or copy mode, mirror 58 pivots up to the exposure or copy position shown in dotted lines in FIG. 2 thereby unblocking the film unit 70 for exposure. It will be noted that when moved to the copy position, mirror 58 blocks or closes a light transmission aperture 80 at the trailing end of a cone-like light baffle or light shield 82 surrounding screen 18 and extending rearwardly therefrom to the copy position of mirror 58.

In the viewing mode of operation, the operator actuates a slide change button switch 84 on a control box 86 connected to a later to be described electrical power and control system in housing 12 via a cable 88. This actuates the slide changer 50 which moves a slide 46 from cassette 44 to the projection position 52. At this point illumination system 54 is on and the shutter 60 is open or in unblocking relation to lens 56. Lens 56 forms an image of the illuminated slide at position 52 and projects the image bearing light downwardly where it impinges mirror 58 located in the viewing position and is reflected therefrom through aperture 80 and onto the rear projection screen 18 for viewing. Lens 56 and mirror 58 in the viewing position cooperate to define a first optical path from projection position 52 to screen 18.

In the viewing mode, slider viewer/copier 10 operates more or less like a conventional slide viewer or projector. The slides are projected in sequence by repeated actuations of button switch 84 which results in the slide changer 50 moving one slide 46 from position 52 into the storage cassette 48 and replacing it with the bottommost slide 46 from supply cassette 44.

When the operator sees a slide 46 that he wants to copy, he actuates button switch 90 on control box 86 which initiates the conversion of viewer/copier 10 to its copy mode of operation.

During a copy cycle of operation, the normally open shutter 60 closes thereby blocking the transmission of image bearing light through lens 56. The mirror 58 is pivoted to its copy position whereby it uncovers aperture 78, is out of optical alignment with lens 56, and it blocks aperture 80. Shutter 60 then opens such that the image of the illuminated slide 46 is projected by lens 56 onto the film unit 70 at the exposure position. The lens 56, therefore defines a second optical path from position 52 to the exposure position.

After the appropriate exposure interval, shutter 60 closes to terminate exposure. Mirror 58 is pivoted back to its viewing position and the shutter 60 opens once again to its normal position. Following the exposure termination and the movement of mirror 58 to the viewing position, the processor unit 66 is actuated causing the exposed film unit 70 to be advanced between pressure applying rollers 72 and 74 and at least partially out of the viewer/copier 10 via slot 76 where it may be grasped by the operator. Film unit 70 is preferably the type in which the development and diffusion transfer process can be completed in the ambient illumination outside the confines of housing 12.

Once mirror 58 is in the viewing position and shutter 60 is open, viewer/copier 10 is once again operational in the viewing mode. The slide 46 at position 52 may be changed by actuating button switch 84 or another copy of the slide at position 52 may be made by once again actuating button 90. When button 90 is actuated, the conversion from the viewing mode to copy mode and then back to the viewing mode is accomplished in a matter of a few seconds. Therefore the interruption of the slide showing is minimal and the copy is made automatically and quickly with almost no inconvenience to the operator and his viewing audience.

If the size of the image projected onto viewing screen 18 is to be larger than the image projected onto the film unit 70, then a focusing adjustment or other modification must be made in the optical system during the copy mode of operation. As will be described later, provisions are made for automatically moving lens 56 relative to a slide 46 at position 52 between viewing mode and copy mode positions to compensate for the different image magnification factors.

The preferred self-developing film unit 70 for use with viewer/copier 10 is shown in FIGS. 2 and 3 of the drawings. It is an integral "nonpeel-apart" type film unit which includes all of the elements necessary to provide a full color positive image reflection print.

Basically the film unit 70 is a multilayer structure or laminate which is diagrammatically illustrated in FIG. 2 as including a bottom sheet-like element 92 and a superposed top sheet-like element 94. Attached to the leading end of element 92 and 94 is a rupturable container 96 holding a supply of fluid processing composition 98 therein.

In actuality, the multilayer structure includes an opaque bottom support sheet, a top transparent support sheet, and a plurality of layers sandwiched therebetween and including one or more photosensitive layers and one or more image-receiving layers. The laminate is bound along its edges by a binding element 100 (see FIG. 3) which also defines the bounds of a generally square or rectangular image-forming area 102. The top transparent support sheet serves as a "window" through which actinic radiation is transmitted to expose the photosensitive layer or layers. The final positive image is also viewed through the window. Subsequent to exposure, the film unit 70 is progressively advanced between the pair of pressure-applying members or rollers 72 and 74 which discharge the fluid 98 and distribute it between a predetermined pair of adjacent layers within the multilayer structure. Preferably, the processing fluid contains a light opacification system which allows the development and diffusion transfer process to be completed in ambient illumination outside of viewer/copier 10.

In FIG. 2 of the drawings, the fluid 98 is adapted to be spread between elements 92 and 94 which are intended to illustrate the interface between the predetermined pair of adjacent layers. In reality, element 94 includes the top transparent support sheet in certain chemical layers and element 92 includes the bottom support sheet and certain other chemical layers.

For a more detailed description of film unit 14, reference may be had to U.S. Pat. No. 3,415,644 issued to E. H. Land on Dec. 10, 1968.

Referring to FIG. 4, the film container 68 is generally a box-like structure, preferably of molded plastic construction, and includes a forward wall 104, a rear wall 106, and a peripheral section joining walls 104 and 106 and including a pair of lateral side walls 108, a trailing end wall 110 and a leading end wall 112. Forward wall 104 has a square or rectangular exposure aperture 114 therein which is coextensive with the image-forming area 102 of the film unit 70.

The film units 70 are arranged in stack relation within film container 68 such that the forwardmost film unit bears against the interior surface of forward wall 104 and is located in position for exposure through exposure aperture 114. Subsequent to exposure, the forwardmost film unit 70 is adapted to be advanced from film container 68 and into engagement with rollers 72 and 74 through an elongated film withdrawal slot 116 in leading end wall 112. As will be described later, film processor unit 66 includes a film advancing mechanism which is adapted to extend through an access opening 118 which extends rearwardly along forward wall 104 and part way down trailing end wall 110 near a trailing end corner of film container 68 for engaging and advancing the exposed forwardmost film unit 70 through film withdrawal slot 116.

The stack of film units 70 is spring biased toward the interior surface of forward wall 104 by a spring platen (not shown). A dark slide (not shown) is initially provided in container 68 so as to block exposure aperture 114 and access opening 118 and light shield the forwardmost film unit 70. Once container 68 is located in its operative position in processor unit 66, the dark slide may be withdrawn from container 68 through withdrawal slot 116 in the same manner as a film unit 70.

The film container 68 may include a flat battery therein (not shown) such as is provided in the commercially available SX-70 film pack manufactured by the Polaroid Corporation, Cambridge, Mass. The battery, having a pair of contacts that are accessible through a pair of access openings contain bottom wall 106, is intended to power the electrical components in self-developing camera. As will be discussed later, such a battery may or may not be used to power certain electrical components associated with processor unit 66.

Figure 5:
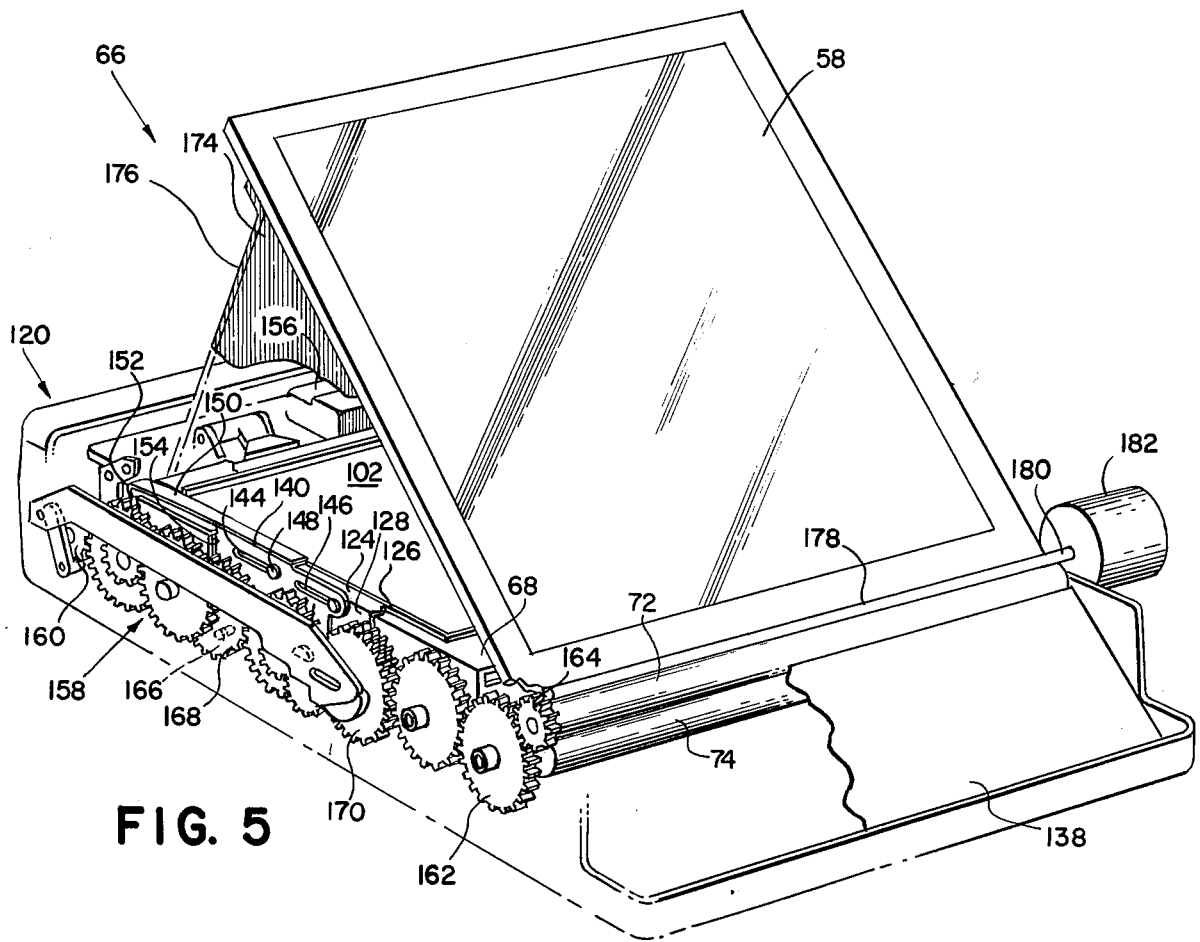
FIG. 5 is a perspective view, partly cut away, of the film processor unit and movable mirror assembly with the mirror shown in its film covering viewing position.

The film processor unit 66 as shown in FIGS. 1, 2 and 5 includes a base section 120, having an open ended film container receiving chamber or frame 122 therein, and the previously mentioned roller assembly 36 which forms a forwardly protruding extension of base section 120 when located in its closed operative position. Base section 120 is mounted on interior housing wall 30 and extends slightly forwardly of wall 26 into cavity 32. By pivoting assembly 36 to the open position, access is provided to the open end of chamber 122 through which a film container 68 is inserted thereinto.

The chamber or frame 122 is defined in part by a generally horizontally disposed planar support plate 124 having a rectangular opening 126 therein that is coextensive with aperture 114 in film container forward wall 104. The underside of plate 124 serves as a bearing or reference surface against which the forward wall 104 of film container is urged (by a pressure spring assembly 127 at the bottom of chamber 122 which bears against the rear wall 106 of container 68) to locate the forwardmost film unit 70 in position for exposure. The chamber 122 is further defined by side walls 128 and a trailing end wall 129 which the film container 68 engages for proper lateral and longitudinal orientation such that this structure in combination with plate 124 and spring 127 serves as means for locating a self-developing film unit 70 in position for exposure.

When container 68 is located in the operative position in chamber 122, the film withdrawal slot 116 is substantially aligned with the bite line of the juxtaposed cylindrical rollers 72 and 74 mounted on assembly 36 located in its closed operative position.

Assembly 36 includes a shell type housing defined by a bottom wall 130, an upstanding leading end wall portion 131, and a pair of lateral side walls 132. The bottom wall 130 is secured to the bottom side of a roller mounting bracket 134 which rotatably mounts the pressure applying rollers 72 and 74. Extending rearwardly from the sides of bracket 134 are a pair of pivot arms 136 which are pivotally coupled to chamber side walls 128 thereby mounting assembly 36 for pivotal movement between its closed and opened position. A releasable latch (not shown) is provided to hold assembly 36 in its closed position.

The film exit slot 76 is formed in bottom wall 130 near wall 131 and is offset from the bite line of the rollers 72 and 74. Intermediate the exit side of the rollers and slot 76 is an inclined film deflector plate and light shield 138 which extends laterally between side walls 132 and is positioned in the normal path of travel of the film unit 70 as it emerges from the rollers. Plate 138 serves to deflect the emerging film unit downwardly from the normal path of travel and guide it to the offset exit slot 76. By deflecting the film unit 70, plate 138 induces a gentle large radius bend therein, on the exit side of the rollers, which has been found to substantially improve the unformity of the distribution of the processing fluid 98 within the film unit 70.

Processor unit 66, as best shown in FIGS. 2 and 5, includes film advance means or a pick 140, mounted on one side wall 128 of receiving chamber 122 for linear reciprocating movement between first and second positions for engaging the trailing edge of the forwardmost film unit 70 in container 68, through access opening 118, and advancing the film unit 70 forwardly through container withdrawal slot 116 and into engagement with rollers 72 and 74. At least one roller (72) is adapted to be rotatively driven so as to advance the engaged film unit 70 relative to the rollers 72 and 74 while they apply a compressive pressure to effect distribution of the processing fluid 98.

Pick 140 is a T-shaped member having elongated slots 144 and 146 therein through which guide pins 148 on wall 128 extend to mount pick 140 for sliding reciprocating movement toward and away from rollers 72 and 74 between the first and second positions. Extending rearwardly from the center section of pick 140 is an elongated pick arm 150 which terminates in a hooked end 152 that extends through container aperture 118 to engage the trailing edge of the forwardmost film unit. Pick 140 is normally biased toward its first or rearwardmost position by a spring (not shown) and includes an outwardly bent flange 154 which is adapted to be engaged by a later to be described drive pin for advancing pick 140 forwardly to its second position against the bias of the spring.

In a preferred embodiment of the invention, the top roller 72 and the pick 140 and adapted to be motor driven. As best shown in FIG. 5, processor unit 66 preferably includes a small high speed D. C. electrical drive motor 156 mounted in the base section 120 behind the trailing end of chamber 122 and a gear train assembly 158 for transferring power from motor 156 to top roller 72 and to pick 140 in a coordinated manner.

The gear train assembly 158 extends along the side of the receiving chamber 122, outboard of side wall 128 and comprises a plurality of interconnected gears providing power transfer and appropriate speed reduction from motor 156 to the top roller 72. Power flows from a spur gear 160 coupled to the shaft of motor 156 along the train to a roller drive gear 162, at the forward end of train 158 which meshes with a roller gear 164, fixed on the end of top roller 72, when the roller assembly 36 is in its operative closed position. The train 158 also drives the pick 140 by means of an inwardly extending drive pin 166 secured to gear 168 and positioned to engage the flange 154 on pick 140 to drive pick 140 forwardly from the first position to the second position in response to rotation of gear 168. The gear train 152 also includes a timing or control gear 170 for providing a control output to coordinate the operation of roller 72 and pick 140.

At the initiation of a processing cycle, motor 156 is deenergized and pick 140 is in the first position or rearward position. A pick drive gear 168 is preorientated so that drive pin 166 is out of the path of travel of the pick flange 154. After the termination of exposure, motor 156 is energized and roller 72 is rotatively driven via drive train 158 and gear 164. The pick drive gear 168 rotates and the drive pin 166 picks up flange 154 and it drives the pick 140 forwardly to advance the exposed film unit 70 into engagement with rollers 72 and 74. The rollers 72 and 74 in turn drive the film unit 70 relative thereto and at least partially out of housing 12 through exit slot 76 on assembly 36.

In a preferred embodiment the processor unit 66 includes a pick latch (not shown) which latches the pick 140 in the forward position to prevent the pick 140 from being actuated a second time during the film transport cycle by pin 166 because gear 168 rotates through several revolutions to effect the advancement of a film unit 70 between rollers 72 and 74. After the gears in train 158 have rotated through a predetermined number of revolutions sufficient to cause film unit 70 to advance between the rollers, the pick 140 is unlatched and returns to its first position by the biasing spring. Through appropriate controls the motor 156 is deenergized and the gear train is stopped with the pick drive gear 168 and the pin 166 thereon in their proper predetermined orientation.

For a more detailed explanation of the structure of gear train 158, pick 140, motor 156, rollers 72 and 74 and their associated mounting and control structure, reference may be had to U.S. Pat. Nos. 3,709,122; 3,714,879; and 3,810,211, all of which are assigned to the same assignee as the present invention. For an example of another type of motorized film processor unit that may be used in viewer/copier 10, see copending application Ser. No. 628,486 filed on Nov. 4, 1975 to R. M. Augustin et al and assigned to the same assignee as the present invention.

The processor unit 66 also includes an upper light shielding and mirror support section 172 over base section 120 for supporting mirror 58 in its viewing position and for cooperating with mirror 58 to light shield the film unit 70 at the exposure position from light emanating from lens 56 and ambient illumination transmitted through screen 18.

Section 172 is a light blocking shell-like three-sided structure defined by a pair of upstanding side walls 174 and an upstanding trailing end wall 176. The side walls 174 are inclined downwardly from the top of end wall 176 toward the rollers 72 and 74 to the top of base section 120 just short of the rollers so that the top edges of walls 174 and 176 and an intersecting edge of the top of base 120 define the previously noted exposure aperture 78 through which image-bearing light from lens 56 is transmitted for film exposure when mirror 58 is in the copy position. The top edges of walls 174 and 176 also form a support for mirror 58 such that mirror 58 is supported in the proper angular relationship to the lens 56 and screen 18 for viewing mode operation. As shown in FIGS. 1 and 2, the screen 18 is preferably tilted back slightly from the vertical for user viewing comfort.

The mirror 58 is a plate-like structure being dimensioned so as to cover or block exposure aperture 78 in processor unit section 172 when the mirror 58 is located in the viewing position and to cover or block aperture 80 at the end of light baffle 82 extending rearwardly from screen 18 when mirror 58 is in the copy position.

In the illustrated embodiment, mirror 58 has a laterally extending pivot shaft 178 secured to the lower end thereof. Shaft 178 is journalled for rotation in a pair of bearing members (not shown) on the top end of base section 120 near rollers 72 and 74. One end 180 of shaft 178 is coupled to the output shaft of a small electrical motor 182 of the reversible stepping type of driving or rotating shaft 178 to pivot mirror 58 between its viewing and copy positions.

The stepping motor 182 is driven by a series or a train of pulse input signals provided by a later to be described logic circuit. In response to each pulse input signal, the motor output shaft rotates through a predetermined arc segment. Therefore the output shaft of the motor 182 may be driven through a predetermined total arc segment from a given starting point by providing motor 182 with the proper number of input pulses. The direction of the motor shaft rotation is controlled by the polarity of pulse signals.

Assume now that mirror 58 is in the viewing position and motor 182 is deenergized. To pivot mirror 58 to the copy position, motor 182 is fed with a predetermined number of positive polarity pulse signals. The mirror 58 is then pivoted back to the viewing position by feeding motor 182 with an equal number of negative polarity pulse signals.

While the illustrated embodiment utilizes the stepping motor 182 to drive mirror 58 between its viewing and copy positions, it is within the scope of the present invention to spring bias mirror 58 for movement from the viewing position to the copy position and utilize the processor motor 156 and components associated therewith and with gear train assembly 158 to recock the mirror 58 or drive it back from the copy position to the viewing position against the bias of the spring. In the previously noted U.S. Pat. Nos. 3,709,122; 3,714,879; and 3,810,211, the motor and gear train assembly are utilized to recock a camera reflux member and it will be obvious to one skilled in the art that with modifications of that structure, the same type of techniques can be used to move mirror 58.

As noted earlier, the mirror 58 is moved out of optical alignment with lens 56 in the copy mode and does not perform an imaging function for film exposure. However, it does perform a light blocking function by closing off the aperture 80 at the end of cone baffle 80 thereby shielding the film unit 70 at the exposure position from ambient light transmitted through screen 18.

The slide cassettes 44 and 48, slide changing mechanism 50, illumination system 54, and an assembly including lens 56 and shutter 60 are shown in somewhat diagrammatic form in FIG. 2. For visual clarity, support structure, light baffle, etc., associated with these elements have not been included in the drawing since it is not necessary to the understanding of the invention and will be obvious to those having ordinary skill in the art.

The illumination system 54 includes a projection lamp 184 and its reflector 186, an angled mirror 188 positioned above position 52 for reflecting light from lamp 184 downwardly toward position 52, and a fresnel or condenser lens 190 between mirror 188 and position 52 for providing an even distribution of light intensity at position 52. The lamp 184 may be of the tungsten halogen type or any other suitable lamp providing sufficient light intensity for both slide viewing and film exposure and appropriate color balance compatible with the characteristic of the film unit 70.

It will be understood that viewer/copier 10 also includes means (not shown), such as an air fan and/or appropriate dichroic filters to dissipate or otherwise prevent the heat generated by lamp 184 from adversely affecting a slide 46 located at the projection position 52.

Viewer/copier 10 may also include provisions for inserting color balancing filters into the illumination and/or optical path to the film plane to achieve color balance between the lamp 184 and the film unit 70 and/or between an individual color slide 46 and the film unit 70.

Power for illuminating lamp 184 is supplied from a later to be described power and logic circuit which is housed in a container designated 192 located to the rear of the lamp assembly.

The vertically disposed supply cassette 44 is located to the left of the projection station 52, as viewed in FIGS. 2 and 7, and the vertical storage cassette 48 is located directly below cassette 44 in spaced relation thereto. The cassettes 44 and 48 are releasably supported in the operative positions shown by support structure (not shown) and may be removed from housing 12 through access door 40 for loading and unloading slides 46.

Figure 6:
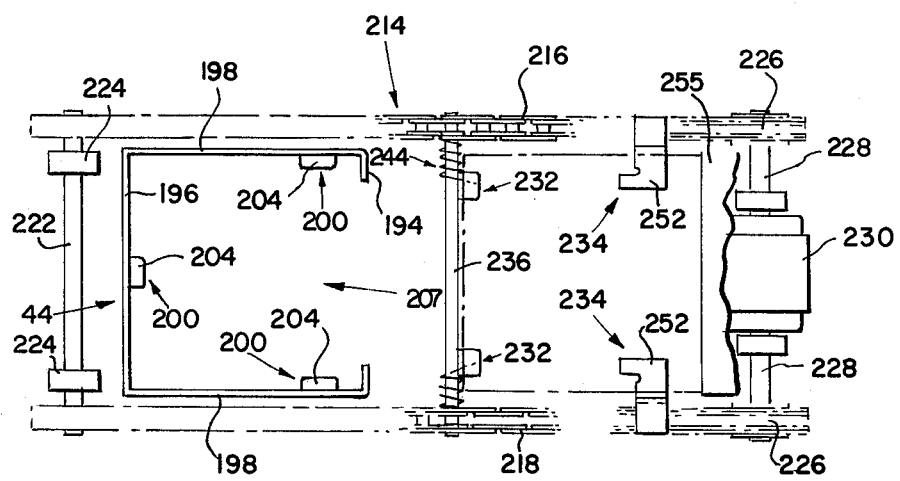
FIG. 6 is a top elevational view, partly in section, of a slide changer assembly and slide supply cassette.
Figure 7:
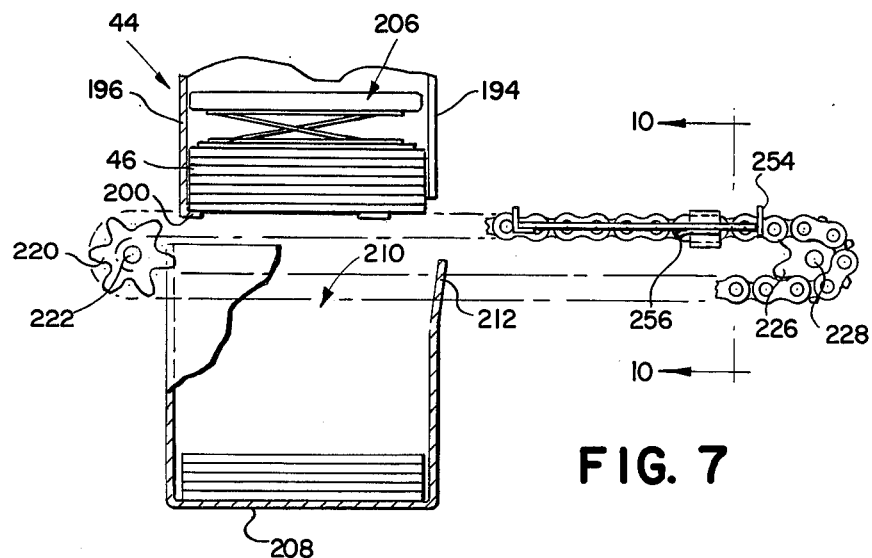
FIG. 7 is a side elevational view, partly in section, of the slide changer of FIG. 6 and showing both the supply cassette and a slide storage cassette.

The supply cassette 44 is formed as a generally square hollow tube defined by a forward wall 194, a rear wall 196 and a pair of side walls 198 as best shown in FIGS. 2, 6 and 7.

Depending from the bottom edges of cassette rear wall 196 and side walls 198 are three L-shaped support tabs or flanges 200 for supporting the stack of slides 46 in cassette 44. Each flange 200 includes a vertically depending section 202 and an inturned horizontal section 204 which is located in partial blocking relation to the bottom opening of cassette 44. The bottommost slide 46 in the stack sits or rests on the horizontal sections 204 of the three tabs 200 and is supported thereby. The rest of the stack is supported in turn by the bottommost slide 46. The flanges 200 are dimensioned so that the distance from the bottom edges of cassette walls 194, 196 and 198 to the upper support surface of the flange section 204 is just slightly more than the thickness of a slide 46. Thus the bottommost slide 46 is supported just slightly below the bottom edges of walls 194, 196 and 198 such that there is access to the peripheral edges of the slide and sufficient clearance to slide the bottommost slide to the right to effect its movement from cassette 44 to position 52. The rear flange 200 depends from the center of wall 196. The two side flanges 200 are located to the right of the centerline of walls 198 but are set back from wall 194.

Figure 10:
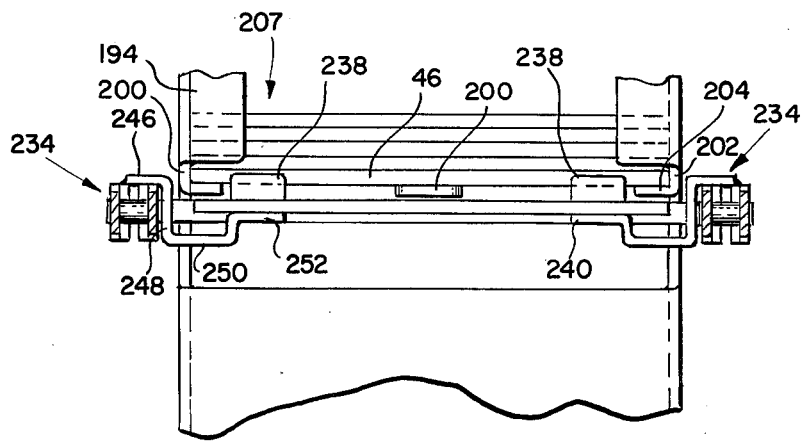
FIG. 10 is an elevational view, partly in section, of the portions of the slide changer and the supply and storage cassettes taken along lines 10—10 of FIG. 7.

The slides 46 are loaded into supply cassette 44 through the open top end thereof. In a preferred embodiment, a small downward biasing force is applied to the stack of slides 46, such as by the diagrammatically illustrated weighted spring assembly 206, to facilitate the operation of a later to be described slide carrier mechanism on changer 50. A vertical slot may be provided in any of the cassette walls to facilitate loading and unloading. Such a slot 207 in wall 194 is shown in FIG. 10.

The storage cassette 48, as best shown in FIG. 7, is formed as a generally square hollow tube having a closed bottom end 208 and an open top end 210. It will be noted that the cross-section dimension of cassette 48 is slightly larger than that of cassette 44 and that the top opening 210 is enlarged or flares out at 212 toward position 52. Cassette 48 is structured in this manner to facilitate the movement of a slide 46 thereinto when it is ejected from slide changer 50.

The slide transparency film units 46 may be 35 mm slides mounted in standard 2 × 2 inches mounts or may be of any other size format and/or include a larger or smaller mount. The slide 46 may be the product of conventional film and processing or may be a self-developing film unit which includes an integral mounting frame or is mounted in a frame subsequent to processing.

Referring now to FIGS. 2 and 6 through 10, the slide changer 50 functions to engage the bottommost slide 46 in cassette 44, advance the slide 46 to position 52 for projection, and thereafter move slide 46 in storage cassette 48.

In the illustrated embodiment, slide changer 50 includes a horizontally disposed endless belt 214 which is defined in part by a pair of closed loop chains 216 and 218.

The chains 216 and 218 are disposed in parallel relation on opposite sides of the cassettes 44 and 46 and are located just outboard of the side walls 198 of cassette 44 and the corresponding side walls of cassette 48 therebelow. To the left of the cassettes 44 and 46 as viewed in FIG. 2, the chains pass around a pair of spaced sprocket wheels 220 which are mounted for rotation on the opposite ends of a cross shaft 222 that is supported by a pair of support members 224 (see FIG. 6). The opposite ends of the chains 216 and 218 pass around a pair of spaced sprocket wheels 226 located to the right of the projection position 52. The sprocket wheels 226 are fixedly coupled to the opposite ends of an output cross shaft 228 of a small electrical drive motor 230 of the reversible stepping type. By feeding motor 230 with the appropriate pulse input signals the endless belt 214 may be driven in either direction and the location of any given point on the belt can be controlled accurately.

Mounted on the top side of the belt 214 is a slide carrier and ejecting mechanism including a pair of L-shaped members 232 for engaging and supporting the trailing end of a slide 46 and effecting the ejection or displacement from the carrier mechanism into cassette 48 and a pair of support pad members 234 for supporting portions of the slide 46 closer to its leading end.

Figure 8:
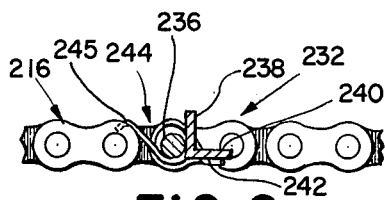
FIG. 8 is an elevational view, partly in section, of a portion of a slide changer drive chain and a slide support member coupled thereto in its slide advance and support position.
Figure 9:
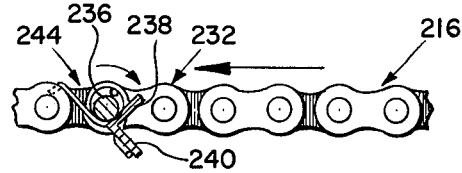
FIG. 9 is similar to FIG. 8 except that the support member is shown moving toward its slide eject position.

As best shown in FIGS. 6 through 10, belt 214 includes a cross shaft 236 secured at its opposite ends to opposite links on the top side of chains 216 and 218. Each L-shaped member 232 includes a vertical section 238 and a horizontal section 240 extending outwardly from the bottom of section 238 in a direction normal thereto. As best shown in FIGS. 8 and 9, horizontal section 240 is fixedly secured to one end 242 of a torsion spring 244 that is wrapped around and supported by shaft 236 and has its opposite end 245 secured to a link of one of the chains 216 and 218. In the unstressed condition, spring 244 supports member 232 in its film supporting position shown in FIG. 8 whereby section 240 is horizontally disposed and supports the trailing end of a slide 46 thereon. When a generally horizontally directed force is applied to the top of section 238, however, the spring allows member 232 to tilt or pivot as shown in FIG. 9.

As best shown in FIG. 6, members 232 are laterally spaced on shaft 236 such that their linear paths of travel are inboard of the side flanges 200 on cassette 44 and are outboard of the centrally disposed rear flange 200 depending from wall 196. Also, members 232 are dimensioned and positioned to engage a slide 46 on the mount portion thereof outboard of the central image area.

The forward slide support members 234 are in opposed relationship on the top side of their respective chains 216 and 218. With reference to FIGS. 6, 7 and 10, each support member 234 includes a horizontal section 246 which rests on top of the link to which it is coupled, a depending vertical section 248 which is secured to the interior side of the link by a pin (not shown), an inwardly turned horizontal section 250 which is followed by an upturned transition to an elevated horizontally inturned slide support surface 252 on which the forward portion of the slide 46 is adapted to rest for support. From FIGS. 6 and 10 it will be evident that the slide support surfaces 252 of member 234 are located laterally inboard of the flanges 200 depending from the side walls 198 of cassette 44 and the depressed sections 250 of members 234 provide clearance for members 234 to clear flanges 200.

As best shown in FIG. 10, the top ends of the vertical sections 238 of L-shaped member 232 are located in alignment with the bottommost slide 46 in cassette 44 so that as members 232 are driven from the projection position 52 into the space between cassettes 44 and 48 (to the left as viewed in FIGS. 2, 6 and 7) the top ends of sections 238 will hit the leading edge of the bottommost slide 46 in cassette 44 causing the L-shaped members 232 to pivot or tilt, as shown in FIG. 9, in a clockwise manner against the bias of springs 244 from the slide support position of FIG. 8. When tilted in this manner the top ends of the sections 238 can slide along the underside of the bottommost slide 46. In the extreme left position, the top ends of L-shaped members 232 clear the trailing end of the bottommost slide 46 and member 232 returns to the erect position of FIG. 8 where the top ends of section 238 are aligned with the exposed trailing edge of the bottommost slide 46 on either side of rear support flange 200.

Assume now that the slide change mechanism 50 is in the orientation shown in FIG. 6 with the slide support members 232 and 234 located at the projection position 52, to the right of cassettes 44 and 48, but without a slide 46 supported thereon. The L-shaped members 232 are held in the film advancing and support erect position of FIG. 8. Motor 230 is off.

Upon actuating button switch 84, motor 239 is energized with a train of a predetermined number of positive polarity pulse signals from the power and logic circuit. The motor shaft 228 is driven in a counterclockwise direction causing the chains 216 and 218 to be driven in a counterclockwise direction.

The top of belt 214 with members 232 and 234 thereon moves to the left. The L-shaped members 232 tilt upon hitting the leading edge of the bottom slide 46 in cassette 44 and slide under it until they clear the trail edge and pop up. The slide support surfaces 252 of members 234 slide under the forward end of the slide 46 just inboard of side flanges 200. As the L-shaped members clear the trailing edge of the bottom slide in cassette 44, motor 230 is deenergized, the length of movement of belt 214 from the projection position 52 to the extreme left position having been controlled by the predetermined number of positive pulses fed to motor 230.

It will be noted that the bottom slide 46 is prevented from moving to the left by the rear support flange 200

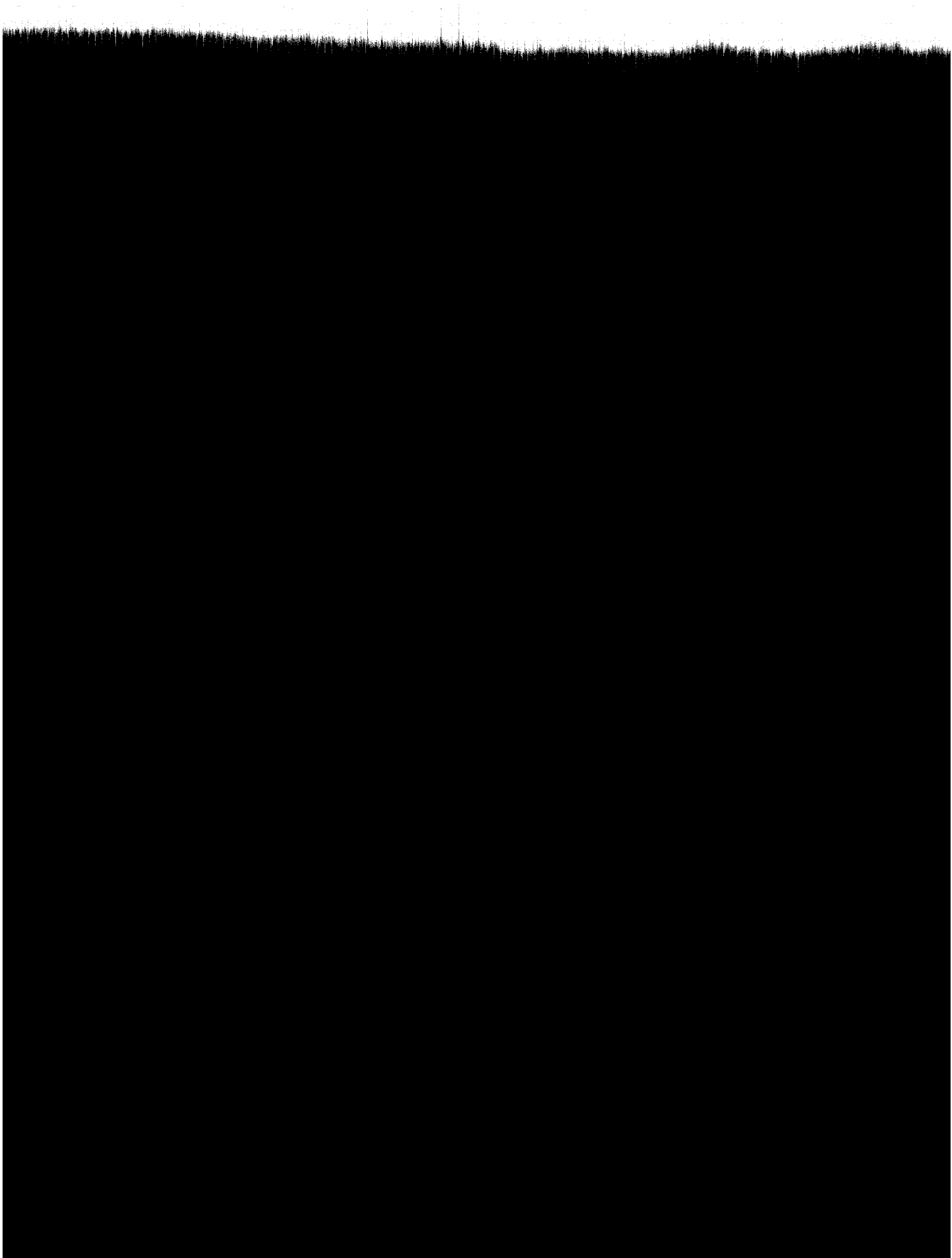

the degree of overlap. When these apertures do not overlap, of course, the shutter blades 260 are in a light blocking mode.

In a preferred embodiment, the ends of blades 260 extending to the left of tube 258 are formed as toothed racks and are in mesh on opposite sides, with a gear 274 fixedly secured to the output shaft of stepping motor 262. When motor 262 rotates, blades 260 are driven in opposite directions to bring the apertures therein into or out of registration depending on the direction of motor rotation.

In the viewing mode, the shutter 60 is normally fully open. Thus the apertures in blades 260 completely overlap. Upon actuation of button switch 90, motor 262 is fed by the logic circuit with a train of positive pulse signals and the blades 260 are driven to the light blocking position. Once mirror 58 has shifted to the copy position, motor 262 is fed with a train of negative polarity pulse signals. The blades 260 are driven in the opposite direction. The apertures therein progressively overlap bringing shutter into its unblocking mode. The photocell 264 monitors the light intensity at the film plane as it feeds its output to an integrating subcircuit. At a predetermined voltage level the integrating circuit provides a trigger signal which reverses the polarity of the pulse signals fed to motor 262. Motor 262 is driven in the opposite direction thereby driving blades 260 to the light blocking position to terminate exposure. Mirror 58 is driven back to the viewing position and motor 262 is fed with a train of pulse signals to drive the blades 260 to the full aperture unblocking viewing position whereupon motor 262 is deenergized.

For an example of a stepping motor shutter assembly suitable for use in viewer/copier 10, reference may be had to U.S. Pat. No. 3,882,522 issued on May 6, 1975 and assigned to the same assignee as the present invention.

The lens 56 is focused, for viewing mode operation, with respect to a particular slide 46 located at position 52 by actuating a dual contact slide switch 276 on control box 86. By pushing switch 276 in one direction, the logic circuit feeds focusing motor 270 with a train of positive polarity pulses and motor 270 is driven in a direction to drive the lens 56 toward position 52 via gears 272, 268 and rack 266. When switch 276 is pushed in the opposite direction, the logic circuit feeds motor 270 with a train of negative polarity pulses, and the lens 56 is driven away from position 52.

As noted, it may be necessary to refocus lens 56, when viewer/copier 10 is converted to the copy mode with respect to position 51 to compensate for the difference in image magnification at the rear projection screen 18 and at the exposure position.

For example, let's assume that slide 46 is a 35 mm slide, lens 56 has a focal length of 25 mm, the image forming area 102 of film unit 70 at the exposure position measures approximately 3.25 × 3.25 inches and screen 18 measures approximately 8 × 8 inches.

After lens 56 has been adjusted for sharp focus of an image on screen 18 during viewing mode operation, it will have to be moved downwardly, or away from slide 46 at position 52, by a distance of approximately 0.140 inches to maintain the same sharp focus at the exposure position. This refocusing adjustment is built into the logic system. That is, the circuit is preprogrammed to automatically feed the lens drive motor 270 with the appropriate number of pulse signals having the correct polarity to drive the lens from the viewing focus position to the copy focus position and then back to the viewing focus position. Alternatively, the optical system may be provided with an auxilliary lens system that is pivoted into alignment with lens 56 by another stepping motor to increase the focal length and magnification of the optical system for viewing mode operation and is pivoted out of alignment with lens 56 for copy mode operation.

Of course, if the size of the film image forming area 102 and screen 18 is substantially the same, then the optical path lengths from lens 56 to the exposure position and to screen 18 (via mirror 56) will be substantially equal and such refocusing or modification of focal length of the optical system will be unnecessary.

Figure 11:
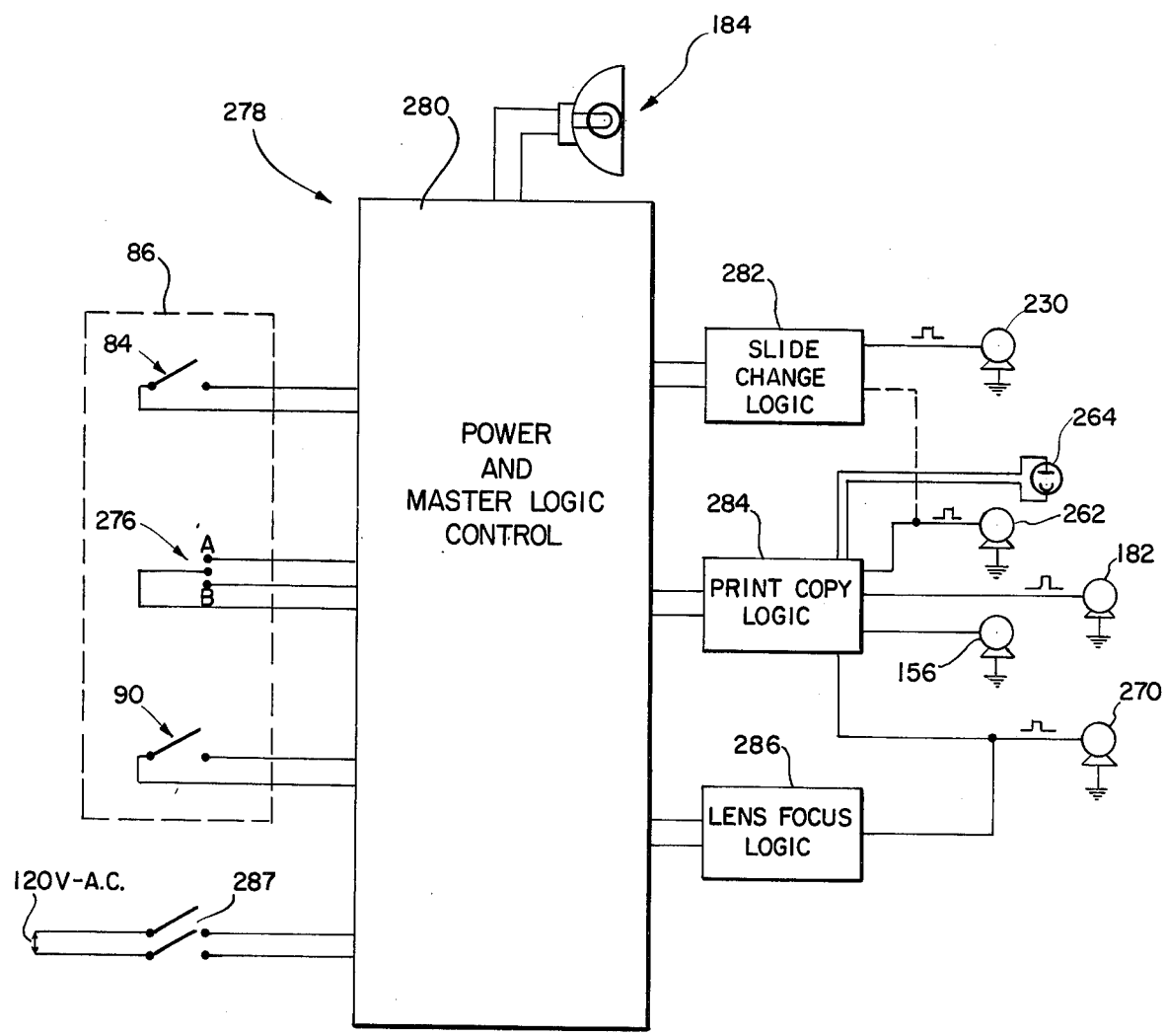
FIG. 11 is a diagrammatic representation of an electrical power and logic control system for the viewer/copier shown in schematic block diagram form.

The power and logic control circuit 278 for operating viewer/copier 10 is diagrammatically shown in schematic block diagram form in FIG. 11 of the drawings.

Circuit 278 includes a Power and Master Logic Control circuit 280 and several subcircuit electrically coupled thereto and including a Slide Change Logic circuit 282; a Print Copy Logic circuit 284; and a Lens Focus Logic Circuit 286.

Circuit 280 is adapted to be connected to a source of 120 v. A.C. electrical power through an ON-OFF switch 287 and includes a power supply section for supplying A.C. power to lamp 184, and other equipment such as a cooling fan (not shown) and for providing D.C. power for the operation of circuit 278 and the various components connected thereto. Circuit 280 also provides master switching in logic control for coordinating the operation of the logic circuits 282, 284 and 286. It will be understood that circuits 280, 282, 184 and 286 includes appropriate logic elements, integrated circuits and/or microprocessers which allow certain of the later to be described functions to be preprogrammed.

Once the power switch 287 is turned on, the lamp 184 connected to circuit 280 is energized. The operator then controls the operation of viewer/copier 10 by actuating the button switches 84, 276 and 90 on control box 86 that are electrically connected to circuit 280 by cable 88.

Actuation of slide change switch 84 provides a logic input signal to circuit 280 which in turn enables, powers and actuates Slide Change Logic circuit 282 which has the slide change motor 230 connected to its output terminal. Motor 230 is initially deenergized and belt 214 is set at a predetermined starting position whereby the slide carrier members 232 and 234 are located at the projection position. Circuit 282 includes a microprocessor unit and an appropriate sensing device and is preprogrammed to perform as follows. Upon being enabled by circuit 280 in response to actuation of switch 84, circuit 282 senses the position orientation with respect to the projection position 52, circuit 282 feeds motor 230 with a train of a predetermined number of positive polarity pulses to drive the belt to the left terminal position and then feeds motor 230 with an equal number of negative polarity pulses to drive the belt 214 in the opposite direction to advance the bottommost slide in cassette 44 to the projection position 52. If belt 214 is not correctly preorientated, circuit 282 senses the amount of left or right deviation and applies the correct number and polarity of pulses to motor 230 to correct the error before applying the train of positive and negative pulses for the slide change function.

In the illustrated embodiment, the exposure position 52 is blocked by the screen 255 on belt 214 to block out screen 18 while a slide is being changed. Alternatively, shutter 60 may be used for this function and circuit 282 also may be preprogrammed to feed the shutter motor 262 with the appropriate pulse signals over an output connection shown in dotted lines in FIG. 11.

The Print Copy Logic circuit 284 has connected to its output terminals, the photocell 264, shutter motor 262, mirror drive motor 182, the film advance and roller drive motor 156, and the lens focusing motor 270.

The Lens Focus Logic circuit 286 is also connected to lens drive motor 270.

During viewing mode operation the operator views the image of slide 46 on screen 18 and adjusts for sharp focus by operating the dual switch 276. When the center contact of switch 276 is moved upwardly, it engages contact and a logic input signal is provided to circuit 280 which in turn enables circuit 286 which is programmed to provide a train of positive polarity pulse signals which rotates motor 270 in a direction to cause the lens tube 258 and the lens 56 therein to be driven upwardly towards the projection position 52. The lens 56 is moved in the opposite direction by moving the center contact of switch 276 downwardly into engagement with contact B. This results in circuit 286 feeding a train of negative polarity pulse signals to motor 270. The train of drive pulses is, of course, terminated by moving the center contact out of engagement with either contacts A or B.

Having focused lens 56 with respect to a slide 46 at the projection position 52 by manually manipulating dual switch 276, the operator initiates the making of a reflection print copy of the slide by actuating button switch 90.

This provides an input signal to circuit 280 which in turn enables, powers and actuates a cycle of operation of the Print Copy Logic circuit 284. Circuit 284 includes a preprogrammed miniprocessor, the light integrating circuit fed by photocell 264, and the necessary logic, timing and control elements to perform the following sequence of functions.

At the initiation of the copy cycle, motors 262, 182, 156 and 270 are deenergized. Shutter 60 is in its fully open aperture position. Shutter motor 262 is fed with a train of a predetermined number of positive polarity pulses to drive the blades 260 to the closed or light blocking position. Motor 182 is fed with a train of a predetermined number of positive polarity pulses and rotates mirror 58 from the viewing position to the copy position thereby unblocking the film unit 70 at the exposure position in processor unit 66 and blocking the aperture 80 at the end of light baffle cone 82. Circuit 286 also feeds lens focus motor 270 with a predetermined number of negative polarity pulses to move lens 56 downwardly a fixed distance for the purpose of refocusing lens 56 with respect to a slide 46 at position 52 and the film unit 70 at the exposure position.

Circuit 286 then feeds shutter motor 262 with a train of negative polarity pulses and the shutter begins to open with the exposure aperture becoming progressively larger with each incremental step movement of the shutter blades 260. The downwardly facing photocell 264 monitors light intensity at the film plane and provides an input signal to the integrating circuit. When the voltage of the integrating circuit reaches a predetermined value, a trigger signal is provided. This signal is used to reverse the polarity of the pulse signals to motor 262 and the shutter blades 260 are driven to the closed position in response to the positive pulse signals, thereby terminating exposure.

The mirror motor 182 is then fed with a train of negative polarity pulses to drive it to the viewing position; and the lens focusing motor 270 is fed with a train of a predetermined number of positive pulses to drive lens 56 upwardly to the previously set viewing focus position. The shutter motor 262 is fed with a train of negative polarity pulses and the shutter blades are driven once again to the fully open position.

Once mirror 58 has been returned to the viewing position, circuit 286 energizes motor 156 on film processor unit 66 for a predetermined time and the exposed film unit 70 is advanced by pick 140 into engagement with rollers 72 and 74. The film unit 70 is advanced between rollers 72 and 74 for fluid distribution and is partially ejected through film exit slot 76 as previously described. The power for running motor 156 may be provided by the power supply section of circuit 280 or alternatively by a battery provided in the film container 68.

The power and logic control 278 is intended to illustrate a circuit for performing the above-noted power, operating and control functions in viewer/copier 10. It will be understood that it is within the scope of the present invention to utilize other circuits, subcircuits, and/or components that will perform these functions.

The illustrated film unit 70 is of the type which requires an additional image reversal beyond that provided by a lens system to achieve a correctly orientated positive image in the positive print. When film unit 70 is used in a camera, the additional image reversal is generally provided by a mirror located in the optical path between the objective lens and the film plane. In viewer/copier 10, such a mirror is not used. The additional image reversal is provided by reversing the slide 46 at projection position 52. It will be understood, however, that optical system of viewer/copier 10 may be modified that will be obvious to those skilled in the art for correct image orientation at the viewing screen 18 and at the film exposure position such that a film unit 70 of the type which does not require such an additional image reversal may be used in conjunction with viewer/copier 10.

In the illustrated embodiment, viewer/copier 10 is shown to include an integral rear projection screen and the optical system configured for rear projection. However, it is within the scope of the invention to provide a viewer/copier 10 which is configured to project an image, during the viewing mode of operation, onto a front projection screen mounted on housing 12, or onto a remote front or rear projection viewing surface or screen not forming an integral part of viewer/copier 10.

As used in this disclosure, the words "viewer" and "projector" may be used interchangeably. That is, viewer/copier 10 may be termed projector/copier 10, especially if it is configured to project an image in the viewing mode onto a separate or remote viewing surface or screen.

Although the illustrated embodiment of viewer/copier 10 is configured to project images of transparency slide film units 46, it is within the scope of the inventive concept to modify viewer/copier 10 so it is capable of projecting images of other "objects" including opaque objects such as small format reflecting print photographics. Opaque objects, of course, would be illuminated by reflection rather than transmission and the illumination path to the object at the projection position would have to be modified accordingly.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus being selectively operable for projecting an image of an object onto a viewing surface for viewing and for making a photographic copy of the object utilizing a self-developing film unit of the type including an integral supply of fluid processing composition that is adapted to be distributed between predetermined. layers thereof subsequent to exposure, said apparatus comprising:

a housing;
   means for releasably holding a plurality of such objects;
   means being operable for moving the objects, in sequence, from said holding means to a projection position within said housing for image projection and thereafter back to said holding means;
   means for illuminating the object located at said projection position;
   means for locating such a self-developing film unit at an exposure position within said housing;
   pressure applying means for engaging and applying a compressive pressure to the self-developing film unit subsequent to exposure to effect the distribution of the processing fluid; and
   optical means being selectively operable in viewing and copy modes of operation for projecting an image of the object at said projection position onto a viewing surface for viewing when operated in said viewing mode and for projecting an image of the object at said projection position onto the self-developing film unit located at said exposure position to effect the exposure of the film unit when operated in said copy mode.

2. Photographic apparatus for initially projecting an image recorded on a slide onto a viewing screen and selectively producing an enlarged photographic copy of the recorded image:

a housing;
   means within said housing for mounting a projection source of illumination;
   means for locating a plurality of image bearing slides;
   means for sequentially advancing each of the slides from its initial position into a projection position within said housing wherein the advanced slide is disposed in image reversal operative relationship with the projection light rays emanating from the source of illumination;
   a projection lens assembly in direct optical alignment with the image carrying light rays emerging from the advanced slide located at said projection position;
   a mirror mounted in direct optical alignment with said lens assembly and inclined with respect to the optical axis of the said lens assembly, said mirror serving to again reverse the image carried by said light rays so that it can be displayed directly from said mirror onto a projection screen in the correct image orientation;
   means for mounting a self-developing film unit of the image reversal type in direct optical alignment with said lens assembly on the opposite side of said mirror from said lens assembly, the film unit being disposed substantially normal to the optical axis of said lens assembly, said mirror serving to preclude the image carrying light rays focused by said lens assembly from exposing said film unit at such times;
   means for selectively displacing said mirror from its position wherein it is disposed in optical alignment with said lens assembly into a second position wherein it permits the image carrying light rays emerging from said lens assembly to expose the self-developing film unit to record thereon a copy of the image on the slide located at said projection position; and
   means for advancing the exposed self-developing film unit from its stated initial position within said housing and for applying a compressive pressure thereacross to effect its processing wherein an image is developed from its recorded image which is viewable in the correct image orientation.

3. The photographic apparatus of claim 2 wherein said housing includes a forward wall and including a rear projection screen mounted in said forward wall and a light shield surrounding said screen extending inwardly of said housing therefrom to define a light transmission aperture, said mirror being arranged to direct the image carrying light rays through said aperture onto said screen when in its position wherein it precludes exposure of the film unit by image carrying light rays from said lens assembly and to block said aperture to preclude actinic light incident on said screen from exposing the film unit when said mirror is in its said second position.

4. Photographic apparatus for initially projecting an image recorded on a slide onto a viewing screen and selectively producing an enlarged photographic copy of the recorded image:

a housing having a base, a forward wall, a top wall and a rear wall;
   a rear projection screen mounted in said forward wall and inclined so its top portion is disposed rearwardly of its bottom portion;
   means within said housing for mounting a projection source of illumination adjacent said top wall so that it is positioned above at least a major portion of said rear projection screen;
   means for locating a plurality of image bearing slides;
   means for sequentially advancing each of the slides from its initial position into a projection position within said housing wherein the advanced slide is disposed in image reversal operative relationship with the projection light rays emanating from the source of illumination;
   a projection lens assembly having its optical axis disposed substantially vertically within said housing and positioned in direct optical alignment with the image carrying light rays emerging from the advanced slide located at said projection position;
   means for mounting a self-developing film unit of the image reversal type in direct optical alignment with said projection lens and adjacent said base with the film unit disposed substantially horizontally within said base at a position below said projection screen;
   a light shield surrounding said screen extending inwardly of said housing therefrom to define a light transmission aperture;
   a light blocking shell-like structure extending inwardly of said housing from the film unit to define an exposure aperture through which image-bearing light rays from said lens assembly may be transmitted onto the film unit.

a mirror;

means for mounting said mirror for displacement between a first mirror position wherein it is in light sealing relationship with said shell-like structure so as to preclude image-carrying light rays emanating from said lens assembly from exposing the film unit and redirects such image carrying light rays through said light transmission aperture onto said screen, said mirror serving to again reverse the image carried by the light rays so that it is displayed on said screen in the correct image orientation, said mirror also serving when in its said first position to preclude actinic light entering said housing through said projection screen from exposing the film unit, and a second mirror position wherein said mirror is in light sealing engagement with said light shield extending inwardly of said housing from said projection screen to preclude light rays entering said housing through said projection screen from passing through said light transmission aperture to expose the film unit while permitting the film unit to be exposed by image carrying light rays emanating from said projection lens assembly to record thereon a copy of the image on the slide located at said projection station; and means for advancing the exposed self-developing film unit from its stated initial position within said housing to a position wherein it is manually accessible to an operator of said apparatus and for applying a compressive pressure across the exposed film unit during its advancement to effect its processing wherein an image is developed from its recorded image which is viewable in the correct image orientation.

* * * * *